United States Patent Office 2,894,974
Patented July 14, 1959

---

2,894,974

NEUTRAL ESTERS OF SPIRO HETEROCYCLIC PHOSPHORIC ACIDS AND THIONO PHOSPHORIC ACIDS

William M. Lanham, Charleston, W. Va., assignor to Union Carbide Corporation, a corporation of New York No Drawing. Application October 24, 1956
Serial No. 617,915

15 Claims. (Cl. 260—461)

This invention relates to a novel class of neutral spiro heterocyclic esters of phosphoric acid, and to novel methods for their production. More especially it relates to the production of novel spiro esters of phosphoric acid and thionophosphoric acid having structures corresponding to the formula:

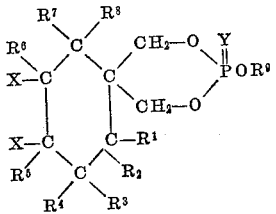

wherein $R^1$ to $R^8$, respectively, represents a radical of the class consisting of hydrogen and the phenyl, halogen and the alkyl radicals, $R^9$ represents a radical of the class consisting of the alkyl, alkenyl, alkoxyalkyl, aralkyl, haloalkyl, monocyclic aryl, alkaryl, haloaryl, nitroaryl, and alkylmercaptoalkyl radicals, each X designates hydrogen, or the two X's taken collectively represent a second bond between the adjacent carbon atoms; and Y designates a radical of the class consisting of oxygen and sulfur. Typical compounds of the invention include those of the aforesaid formula wherein each of the $R^1$ to $R^8$ is hydrogen, and those wherein one or more of the $R^1$ to $R^8$ represents a methyl, ethyl, butyl or hexyl radical; and wherein $R^9$ represents a methyl, ethyl, butyl, 2-ethylhexyl, decyl, heptadecyl, phenyl, tolyl, xylyl, allyl, 2-butenyl, methoxyethyl, ethoxyethyl, butoxyethyl, benzyl, chloromethyl, 2-chloroethyl, 2-bromoethyl, 2-chloropropyl, 2-fluoroethyl, o-, m-, and p-nitrophenyl, o-methyl-p-nitrophenyl, 2-ethylmercaptoethyl, 2-butylmercaptoethyl, 2,4,6-trimethylphenyl, or an o-, m-, or p-chlorophenyl radical.

The novel spiro heterocyclic compounds of the invention have utility as insecticides, being effective against such pests as the bean aphid, the red spider mite and the Mexican bean beetle larvae. Thus, to illustrate, a 95–100% control of bean aphids present on nasturtium plants is secured in 24 hours by treating the latter with an aqueous solution containing 0.06 g. of the compound of Example 1 per 100 cc. of such solution.

Furthermore, the novel compounds are useful as plasticizers for vinyl chloride-containing resins. Thus, the compounds of Examples 2 and 8 readily plasticize resinous copolymers of vinyl chloride and vinyl acetate containing 96% of the chloride in the polymer in weight concentrations of around 1:2 of plasticizer to resin. Likewise, the compounds of Examples 1, 3 to 7, and 9 readily plasticized polyvinyl chloride resins at weight concentrations of around 1:2 of plasticizer to resin. A mixture, consisting of 64.5% of the resin, 35% of the plasticizer, and 0.5% of dibutyl tin maleate as stabilizer was fluxed for 5 minutes at 158° C. on a differential two-roll mill, and the resultant product examined.

The compounds also have potential utility as petroleum oil additives, dye-assistants in dye baths, and as flameproofing agents.

The novel compounds of the invention can be made by reacting a spiro phosphorus- and halogen-containing compound having the structure:

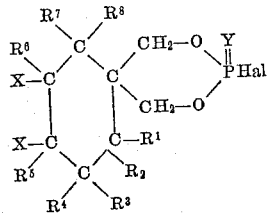

wherein $R^1$ to $R^8$, X and Y have the meaning hereinbefore indicated, and Hal designates a halogen, such as chlorine, bromine or fluorine, with an aliphatic or an aryl monohydric alcohol, an alkali metal alcoholate or phenolate, or an epoxy compound such as ethylene oxide, propylene oxide and epichlorohydrin, according to one of the following representative equations:

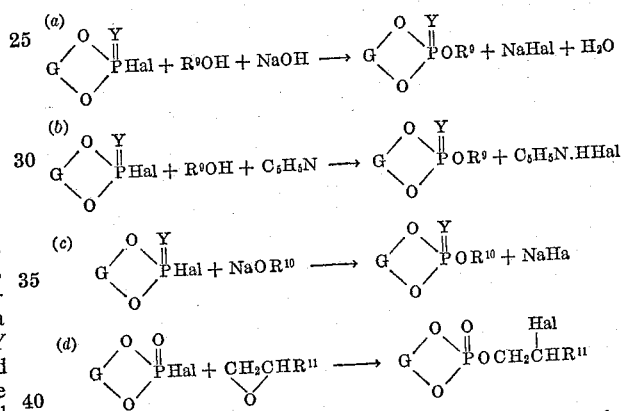

wherein G represents the hydrocarbon residue of a cyclohexene-1,1-dimethanol, or a cyclohexane-1,1-dimethanol; Y designates oxygen or sulfur; $R^9$ designates the radicals hereinbefore represented by $R^9$; $R^{10}$ designates an alkyl, aryl, haloaryl, nitroaryl or alkaryl radical; and $R^{11}$ designates hydrogen or a lower alkyl or haloalkyl radical, such as the methyl, ethyl and chloromethyl radicals.

When employing the process of Equation (a), the preferred procedure is to add the spiro heterocyclic phosphorus-containing compound (desirably, but not necessarily in solution in an inert solvent for the reactants, such as ethylene dichloride or benzene), to an agitated solution or finely divided suspension of an alkali metal hydroxide, such as sodium hydroxide in the alcohol or the alcohol-volatile solvent solution. If desired, the alcohol solution of the alkali metal hydroxide may be added to the phosphorus-containing reactant, preferably in solution in an organic solvent for the reactants such as ethylene dichloride. While the alkali metal hydroxide can be employed in stoichiometric amount, it is preferred to employ a 2 to 100% mol excess thereof. If desired, alkali metal carbonates such as sodium and potassium carbonate can be substituted for the said hydroxide. The reaction readily proceeds at temperatures within the range from around 10° C. to around 25° C., which is preferred. However, temperatures ranging from −20° to 70° C. are operable. The resultant spiro phosphate esters can be isolated as essentially pure residue products by washing with water until neutral toward litmus, and thereafter stripping off the volatile solvent by distillation under high vacuum.

When employing the process illustrated in Equation (b) which involves the reaction of a spiro heterocyclic phosphorus-containing oxychloride or a corresponding thionochloride, and an alcohol or substituted alcohol, in the presence of a tertiary amine, such as pyridine, triethylamine and N,N-dimethylaniline, it is preferable to add the alcohol to an agitated solution consisting of the phosphorus-containing reactant, the tertiary amine, and an inert solvent therefor. However, the phosphorus-containing reactant can be added to the solution of the alcohol and amine in an inert solvent. Reaction temperatures within the range from —20° C. to 100° C. are useful. It is advantageous to use at least the theoretical quantity of alcohol required and, indeed, to employ 5% to 100% excess of the alcohol in cases where removal of excess alcohol after the reaction would not be difficult. At least one mol of the tertiary amine is required per mol of the phosphorus-containing reactant. After the reaction, the reaction mixture is filtered and the filtrate is washed with an alkali metal carbonate or hydroxide to neutralize the dissolved amine hydrochloride before attempting to isolate the desired spiro ester. The form of process illustrated in Equation (b) is exemplified in Examples 3 and 5.

Equation (c) illustrates a third process for making the novel products of this invention. In that process, the reaction usually is initiated by the dropwise addition of a solution of the spiro heterocyclic phosphorus-containing oxyhalide or thionohalide in an inert solvent to an agitated suspension of the dry alkali metal salt of the alcohol or phenol in an inert diluent held at 25° C. After the addition, the reaction mixture preferably is heated at a temperature within the range from 50° C. to 100° C. to complete the reaction, although temperatures ranging from —20° C. to 200° C. are operative. The reaction can be conducted in the presence of catalysts such as a tertiary amine or copper powder. However, the use of a catalyst is not essential. It is usually advantageous to use a 2% to 20% mol excess of the alcoholate or phenolate. The desired spiro esters commonly are readily isolated as residue products of high purity by washing with water until neutral toward litmus, and thereafter stripping off the inert solvent and/or diluent by distillation under high vacuum. This process for making the novel compounds is illustrated in Examples 1, 2, 7 and 9.

Equation (d) and Example 6 illustrates a fourth method for making certain novel products of the invention. The reaction indicated usually is conducted by adding a 50% to 100% by weight excess of the epoxy compound to a solution of the spiro heterocyclic phosphorus-containing oxyhalide and a suitable catalyst such as titanium tetrachloride, in an inert solvent such as ethylene dichloride.

The spiro heterocyclic phosphorus-containing halide starting materials are made by reacting a phosphoryl halide or a thiophosphoryl halide with a 1,3-diol having two methylol groups directly connected to the same carbon atom of either a cyclohexene or a cyclohexane ring, conveniently at temperatures around 25° C. to 45° C. or higher. Such a process is described in my copending application, Serial No. 446,649, filed July 29, 1954.

Among the compounds useful as starting materials in this process may be mentioned: spiro((2-chloro-2-oxo-1,3,2 - dioxaphosphorinane) - 5,4′ - (3′ - phenylcyclohexene)); spiro((2 - chloro - 2 - oxo - 1,3,2 - dioxaphosphorinane) - 5,4′ - (3′ - methyl - 3′ - phenylcyclohexene)); spiro((2 - chloro - 2 - oxo - 1,3,2 - dioxaphosphorinane) - 5,4′ - (2″ - chloro - 5′ - methylcyclohexene)); spiro((2 - bromo - 2 - oxo - 1,3,2 - dioxaphosphorinane) - 5,4′ - (2′ - bromo - 5′ - methylcyclohexene)); and spiro((2 - chloro - 2 - oxo - 1,3,2 - dioxaphosphorinane)-5,4′-(3′,6′-diphenyl-5′-methylcyclohexene)).

The following examples will serve to illustrate the invention:

Example 1

To an agitated suspension of 0.304 mol of sodium ethoxide in 600 cc. of benzene maintained at 25° C.–30° C. there were added dropwise a solution of 60 g. (0.25 mol) of spiro((2-chloro-2-thiono-1,3,2-dioxaphosphorinane)-5,1′-cyclohexane) in 100 cc. of benzene. After an additional 4 hours at 25° C.–30° C., heating at 50° C. 0.5 hour, the reaction mixture was washed with 200 cc. of water and the washed mixture stripped by distillation to a kettle temperature of 50° C. under less than 3 mm. of mercury. The residual 46.5 g. of spiro-((2 - ethoxy - 2 - thiono - 1,3,2 - dioxaphosphorinane)-5,1′-cyclohexane) was secured as a yellow solid residue having the following properties: acidity=0.005 cc. of normal KOH/g.; melting point=73–77° C.; it had the following analysis, in percent by weight: P=12.53 (theory=12.37); S=12.30 (theory=12.80); C=47.58 (theory=47.97); H=7.81 (theory=7.64); Cl=nil.

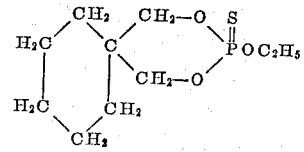

Example 2

A solution of 59.5 g. (0.25 mol) of spiro((2-chloro-2-thiono - 1,3,2 - dioxaphosphorinane) - 5,4′ - cyclohexene) in 150 cc. of benzene were added dropwise to an agitated suspension of 0.304 mol of sodium ethoxide in 500 cc. of benzene during 10 minutes while maintained at 25° C. After an additional 2.5 hours at 25° C. and heating at 50° C. for 0.5 hour, the reaction mixture was cooled to 25° C., washed with 300 cc. of water, and stripped by distillation at 50° C. under less than 5 mm. of mercury pressure. The resulting residue was dissolved in 400 cc. of ethyl ether, precipitated by cooling to —25° C. and filtered. The solid residue was stripped by distillation at 25° C. under less than 2 mm. of mercury, yielding 34 g. of spiro((2-ethoxy-2-thiono-1,3,2-dioxaphosphorinane)-5,4′-cyclohexene) as a white flufly solid having the following properties: acidity=0.03 cc. of normal KOH/g.; M.P.=92–95° C.; and the following analysis in percent by weight: P=12.46 (theory=12.47); S=12.6 (theory=12.91); C=47.93 (theory=48.37); H=6.89 (theory=6.90).

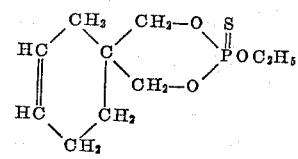

Example 3

During 5 minutes, 0.5 mol of anhydrous ethanol was added dropwise to an agitated solution of 0.3 mol of spiro((2-chloro-2-oxo-1,3,2 - dioxaphosphorinane) - 5,4′-cyclohexene) and 0.5 mol of pyridine in 300 cc. of ethylene dichloride held at 25° C. After maintaining the reaction mixture at 25° C. for 16.5 hours, it was filtered, and the filtrate was neutralized with concentrated aqueous sodium hydroxide, washed with 800 cc. of water, and stripped by distillation at 100° C. under less than 2 mm. of mercury. The resultant still residue was filtered, and the filtrate (59.5 g.) upon standing overnight at 25° C. solidified into spiro((2-ethoxy-2-oxo - 1,3,2 - dioxaphosphorinane)-5,4′-cyclohexene) as a yellow wax-like solid having the following properties: acidity=0.03 cc. of normal KOH/g.; M.P.=about 29° C. It had the following analysis in percent by weight: P=13.29; C=51.61; H=7.60; percent yield (based upon the phosphorus-containing reactant)=85.

Example 4

A solution of 0.3 mol of spiro((2-chloro-2-oxo-1,3,2-dioxaphosphorinane)-5,4'-cyclohexene) in 134 g. of ethylene dichloride was added dropwise during 8 minutes to an agitated suspension of 0.33 mol of powdered sodium hydroxide in 0.33 mol of S-ethylmercaptoethanol in 100 g. of ethylene dichloride maintained at 10° C.–15° C. After agitating the mixture at 25° C. for 53 hours, the mixture was filtered, and the filtrate was washed with 50 cc. of water containing 2.5 g. of sodium hydroxide, diluted with ethyl ether, washed with 400 cc. of water and thereafter successively with aqueous sodium hydroxide and with water until neutral to litmus, dried over calcium sulfate, and stripped by distillation at 100° C. under less than 1.2 mm. of mercury. Thus was obtained 63 g. of spiro((2-(2-ethylmercaptoethoxy)-2-oxo - 1,3,2 - dioxaphosphorinane)-5,4'-cyclohexene) as a yellow liquid residue with the following properties and analysis in percent by weight: acidity=0.04 cc. of normal KOH/g.; percent P=10.30 (theory=10.59); percent S=10.80 (theory=10.96); percent C=48.76 (theory=49.31); percent H=7.47 (theory=7.24); percent Cl=nil.

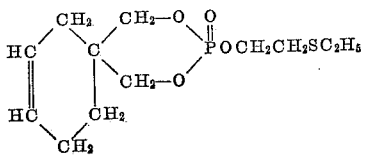

Example 5

During 5 minutes, 0.5 mol of 99% isopropanol was added dropwise to an agitated solution of 0.3 mol of the phosphorus-containing reactant recited in Example 4 and 0.5 mol of pyridine in 300 cc. of ethylene dichloride held at 25° C. After maintaining the reaction mixture at 25° C. for an additional 17.5 hours, it was reacted with 1.0 mol of 85% potassium hydroxide in 200 g. of water, a non-aqueous layer was separated and washed with 800 cc. water, and stripped by distillation at 50° C. under less than 5 mm. of mercury. The resultant residue was diluted with 200 cc. of ethyl ether and filtered. The filtrate was stripped by distillation at 80° C. under less than 2 mm. of mercury, and the residue was diluted with ethyl ether and stripped by distillation at 25° C. under less than 2 mm. of mercury. There thus was secured a good yield of spiro((2-oxo-2-(2-propoxy) - 1,3,2 - dioxaphosphorinane)-5,4'-cyclohexene) having a melting point of 45° C.–49° C.; an acidity equal to 0.06 cc. of normal KOH/g.; and the following analysis in percent by weight: P=12.45 (theory=12.57); C=54.66 (theory=53.62); H=7.55 (theory=7.77); percent Cl=nil.

Example 6

Gaseous ethylene oxide was diffused into a solution of 0.6 mol of the phosphorus-containing reactant described in Example 5 and 3 g. of titanium tetrachloride in 268 g. of ethylene dichloride at a kettle temperature of 50° C. during 18 minutes. After heating the reaction mixture at 50° C. for 1.5 hours and allowing to stand overnight at 25° C., it was stripped by distillation at 70° C. under less than 1.5 mm. of mercury. The resultant 147 g. of yellow mushy solid was dissolved in 268 g. of ethylene dichloride. To the resultant solution was added 2 g. of titanium tetrachloride and ethylene oxide was added during 56 minutes while maintaining a kettle temperature of 70° C. during this period and for an additional 2.5 hours. The reaction mixture then was stripped by distillation at 70° C. under less than 1.2 mm. of mercury, and the resultant fluid residue was diluted with 50 cc. of ethylene dichloride, washed with 300 g. of 20% aqueous trisodium citrate, diluted with 150 cc. of ethyl ether and washed with aqueous sodium hydroxide and with water until neutral to litmus, dried over calcium sulfate, and stripped by distillation at 70° C. under less than 1.2 mm. There was thus secured 122 g. of spiro((2-(2-chloroethoxy)-2-oxo - 1,3,2 - dioxaphosphorinane) - 5,4' - cyclohexene) in the form of a light brown fluid residue having the following properties: $n30/D=1.4970$; acidity=0.002 of normal KOH/g.; salt=0.006 cc. of normal $HClO_4$/g.; and the following analysis, in percent by weight: P=11.32 (theory=11.62); Cl=12.58 (theory=13.29); C=45.20 (theory=45.07) H=6.19 (theory=6.05); percent yield (based on the phosphorus-containing reactant)=76.

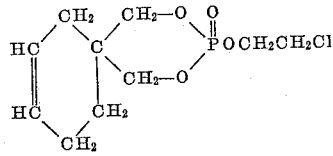

Example 7

A solution of 0.6 mol of spiro((2-chloro-2-oxo-1,3,2-dioxaphosphorinane)-5,4'-cyclohexene) in 268 g. of ethylene dichloride was added dropwise during 8 minutes to an agitated suspension of 0.61 mol of dry sodium phenoxide in 350 cc. of benzene maintained at 25° C. The reactant mixture then was heated at 50° C. for 3.5 hours, after which 4 g. of sodium hydroxide in 100 cc. of water were added and the heating continued at 50° C. for 0.5 hour. The reaction mixture separated upon standing in 2 layers and the oily layer was washed with 700 cc. of water at 60° C.–65° C., and then cooled to 5° C. and filtered. The filtrate was concentrated in vacuo to 100 cc., cooled to 5° C., and the crystals which separated were filtered off. The 2 crystallizations yielded 232 g. of a white solid which was dried at 70° C. under less than 1 mm. mercury, yielding 141 g. of spiro((2-oxo-2-phenoxy-1,3,2-dioxaphosphorinane) - 5,4' - cyclohexene) having the following properties: M.P. 136° C.–137° C.; acidity=0.02 cc. of normal KOH/g.; it had the following analysis, in percent by weight: P=11.17 (theory=11.05); C=60.22 (theory=59.95); H=6.06 (theory=6.07); percent yield (based on the phosphorus-containing reactant)=84.

Example 8

A solution of 0.2 mol of pyridine and 0.2 mol of allyl alcohol was added dropwise during 15 minutes to an agitated solution of 0.2 mol of spiro((2-chloro-2-oxo-1,3,-2 - dioxaphosphorinane) - 5,3' - (1' - (4 - methylphentyl)-cyclohexane) and/or spiro((2 - chloro - 2 - oxo - 1,3,2-dioxaphosphorinane) - 5,4' - (1' - (4 - methylpentyl)-cyclohexane) in 200 g. of benzene held at 25° C. After holding for 109 additional hours at 25° C., and heating at 70° C. for 6 hours, the reaction mixture was neutralized at 25° C. with 0.25 mol of powdered sodium hydroxide, washed with 400 cc. of water, dried over calcium sulfate, filtered, and the filtrate stripped by distillation at 50° C. under less than 2 mm. of mercury pressure. There thus was obtained spiro((2-oxo-2-propenoxy - 1,3,2 - dioxaphosphorinane) - 5,3' - (1' -(4 - methylpentyl)cyclohexane) and/or spiro((2 - oxo - 2 - propenoxy - 1,3,2 - dioxaphosphorinane) - 5,4' - (1' - (4 - methylpentyl)-cyclohexane) having the structures indicated below, in the form of 29 g. of a white solid having the following properties: M.P.=40° C–44° C.; acidity= 0.01 cc. of normal KOH/g.; and the following analysis, in percent by weight: P=8.78; C=61.61; H=9.28; Cl=nil.

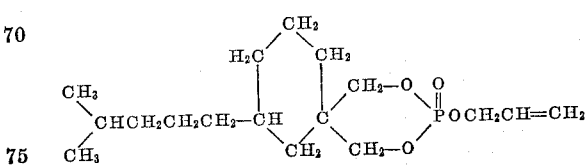

and/or

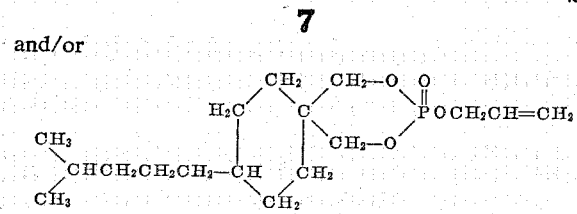

Example 9

A solution of 0.326 mol of spiro((2-chloro-2-oxo-1,3,2-dioxaphosphorinane)-5,4'-cyclohexene) in 150 g. of ethylene dichloride was added dropwise during 6 minutes to an agitated suspension of 0.332 mol of dry p-nitrophenol sodium salt in 300 g. of toluene and 1 g. of triethylamine held at 25° C. The reaction mixture then was refluxed at a kettle temperature of 100° C. for 4.5 hours, allowed to stand overnight at 25° C., diluted with 100 cc. of water and filtered. The resultant 93 g. of solid residue was washed with 400 cc. of water until free from chloride ion and was dried at 70° C. under less than 1 mm. of mercury pressure. There was thus obtained 78.5 g. of spiro((2-(p-nitrophenoxy)-2-oxo-1,3,2-dioxaphosphorinane)-5,4'-cyclohexene) as a tan solid having the following properties: M.P. 143° C.–146° C.; acidity=0.01 cc. of normal KOH/g.; and the following analysis in percent by weight: P=9.65; N=3.97; C=49.67; H=5.15; percent yield (based on the phosphorus-containing reactant)=79.

By the practice of the present invention, novel phosphorus-containing compounds are produced which have a wide field of utility, including those hereinbefore mentioned. Thus, those compounds of the invention containing olefinic unsaturation such as that disclosed in Example 8, are capable of polymerization alone or in conjunction with other polymerizable monomers, such as vinyl chloride, the vinyl esters of lower fatty acids, and acrylic compounds such as acrylonitrile and the lower alkyl acrylates.

The invention is susceptible of modification within the scope of the appended claims.

I claim:

1. As new compounds, spiro heterocyclic phosphorus-containing esters having structures corresponding to the formula:

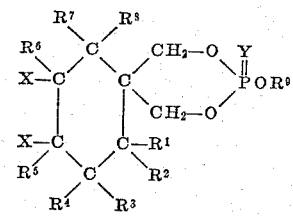

wherein $R^1$ to $R^8$, respectively, represents a member of the class consisting of hydrogen and the phenyl, chlorine, bromine and alkyl radicals having 1 to 6 carbon atoms; each X designates hydrogen, and the two X's collectively designate a second bond between the adjacent carbon atoms; Y represents a member of the class consisting of oxygen and sulfur; and $R^9$ designates a member of the class consisting of the alkyl radicals having 1 to 17 carbon atoms and the lower alkenyl, alkoxy lower alkyl, halo lower alkyl, lower alkylmercapto lower alkyl, phenyl, tolyl, xylyl, benzyl, chlorophenyl and nitrophenyl radicals.

2. As new compounds, the spiro((2-alkoxy-2-thiono-1,3,2-dioxaphosphorinane)-5,4'-cyclohexanes), said alkoxy group having 1 to 17 carbon atoms.

3. As new compounds, the spiro((2-alkoxy-2-thiono-1,3,2-dioxaphosphorinane)-5,4'-cyclohexenes) substituted on at least one carbon atom of the cyclohexene ring by a lower alkyl group, said alkoxy group having 1 to 17 carbon atoms.

4. As new compounds, the spiro((2-alkoxy-2-oxo-1,3,2-dioxaphosphorinane)-5,1'-cyclohexanes), said alkoxy group having 1 to 17 carbon atoms.

5. As new compounds, the spiro((2-alkoxy-2-thiono-1,3,2-dioxaphosphorinane)-5,1'-cyclohexanes), said alkoxy group having 1 to 17 carbon atoms.

6. As new compounds, the spiro((2-alkoxy-2-oxo-1,3,2-dioxaphosphorinane)-5,4'-cyclohexenes), said alkoxy group having 1 to 17 carbon atoms.

7. As new compounds, the spiro((2-alkoxy-2-oxo-1,3,2-dioxaphosphorinane)-5,4'-cyclohexenes) substituted on at least one carbon atom of the cyclohexene ring by a lower alkyl group, said alkoxy group having 1 to 17 carbon atoms.

8. As a new compound, spiro((2-phenoxy-2-oxo-1,3,2-dioxaphosphorinane)-5,4'-cyclohexene).

9. As new compounds, the spiro((2-alkoxy-2-oxo-1,3,2-dioxaphosphorinane)-5,1'-cyclohexanes) substituted on at least one carbon atom of the cyclohexane ring by a lower alkyl group, said alkoxy group having 1 to 17 carbon atoms.

10. As new compounds, the spiro((alkoxy-2-thiono-1,3,2-dioxaphosphorinane)-5,1'-cyclohexanes) substituted on at least one carbon atom of the cyclohexane ring by a lower alkyl group, said alkoxy group having 1 to 17 carbon atoms.

11. The spiro((2-(2-halo lower alkoxy)-2-oxo-1,3,2-dioxaphosphorinane)-5,4'-cyclohexenes).

12. Spiro((2 - 2 - chloroethoxy) - 2 - oxo - 1,3,2 - dioxaphosphorinane) - 5,4' - cyclohexene).

13. The spiro((2 - lower alkenoxy - 2 - oxo - 1,3,2 - dioxaphosphorinane) - 5,4' - cyclohexanes substituted on at least one carbon atom of the cyclohexane ring by a lower alkyl group.

14. Spiro((2 - oxo - propenoxy - 1,3,2-dioxaphosphorinane)-5,4'-(1'-(4-methylpentyl)-cyclohexane.

15. Spiro((2-ethoxy-2-oxo-1,3,2-dioxaphosphorinane)-5,4'-cyclohexene).

References Cited in the file of this patent

UNITED STATES PATENTS

| | | |
|---|---|---|
| 2,506,344 | Cleary | May 2, 1950 |
| 2,661,366 | Gamreth | Dec. 1, 1953 |

OTHER REFERENCES

French et al.: "J. Am. Chem. Soc.," vol. 64, pp. 1497–9 (1942).

Arbuzov et al.: "Chem. Abst.," vol. 45, col. 1512–3 (1951).

UNITED STATES PATENT OFFICE
CERTIFICATE OF CORRECTION

Patent No. 2,894,974                                July 14, 1959

William M. Lanham

It is hereby certified that error appears in the printed specification of the above numbered patent requiring correction and that the said Letters Patent should read as corrected below.

Column 2, line 35, equation (c), extreme right-hand portion thereof, for "+ NaHa" read -- + NaHal --; column 3, line 71, for "-(2″-chloro-" read ---(2′-chloro- ---; column 5, line 18, for "-5.4′-" read -- -5,4′- ---; column 6, line 49, for "-methylphentyl)-" read -- -methylpentyl)- ---; column 8, line 6, for "-cyclohexanes)" read -- -cyclohexenes) ---; line 47, for "(2-oxo-propenoxy-" read -- (2-oxo-2-propenoxy- ---.

Signed and sealed this 29th day of March 1960.

(SEAL)
Attest:

KARL H. AXLINE                                                     ROBERT C. WATSON
Attesting Officer                                         Commissioner of Patents